United States Patent Office 3,445,745
Patented May 20, 1969

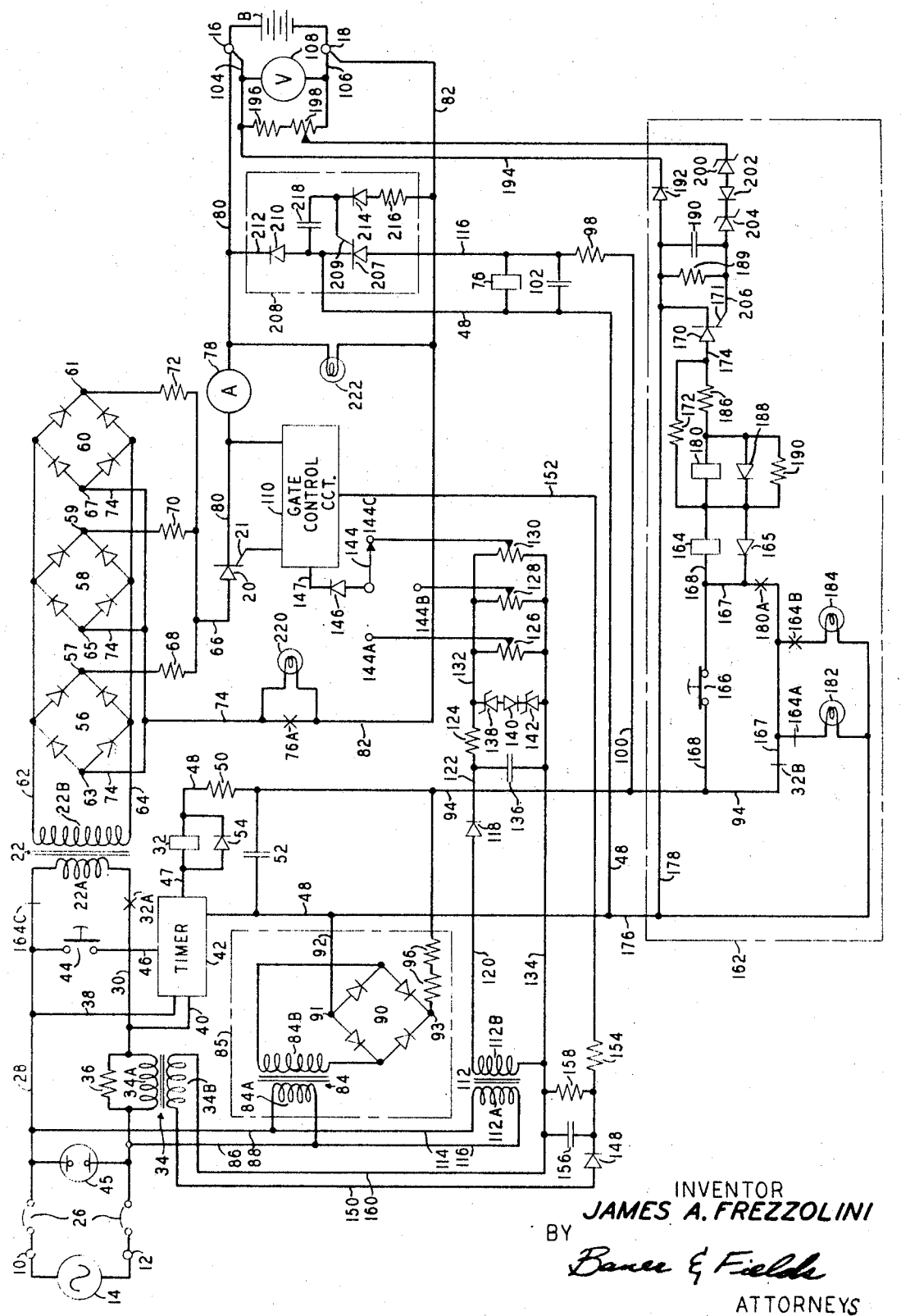

3,445,745
CONSTANT CURRENT BATTERY CHARGER
James A. Frezzolini, Bronx, N.Y., assignor to United Aerotest Laboratories, Inc., Deer Park, N.Y., a corporation of New York
Filed Nov. 18, 1966, Ser. No. 595,518
Int. Cl. H02j 7/04, 7/10
U.S. Cl. 320—29
4 Claims

ABSTRACT OF THE DISCLOSURE

Apparatus for charging a battery at a constant current rate which includes a current source and a pair of output terminals adapted to be connected to the terminals of the battery to be charged. A current regulating means is connected between the current source and the output terminals. A control signal is applied to the current regulating means to maintain a constant current throughout the charging interval. The control signal is derived from a reference network for producing the reference signal and a feedback network which produces a feedback signal proportional to the current flowing through the current regulating means. Additionally, the apparatus further includes analyzing means connected to the terminals of the battery which is adapted to terminate the charging cycle when the terminal voltage of the battery reaches a predetermined level.

---

This invention relates generally to an apparatus for charging a battery and, more particularly, pertains to an apparatus which charges a battery as a constant rate of current and which analyzes the accumulated charge on the battery to determine the condition of the battery.

The charging rate of current in conventional battery chargers is dependent upon the potential difference between the battery being charged and the battery charger. Thus, at the initiation of a charging cycle the current flow through the battery is relatively high. However, as the end of the charge cycle is approached, the potential of the battery increases and, accordingly, the charging current decreases to a relatively low value. Consequently, a relatively long duration of time is required to charge the battery to its rated potential. Since it is desirable to charge batteries quickly, particularly in those applications in which the batteries are used in military installations, the above-described battery chargers have been looked upon with great disfavor.

Additionally, it is imperative for an operator to know the charge accumulating capabilities of a battery to determine the condition of the battery. That is, if a battery cannot or does not accumulate a predetermined quantity of charge within a specified time period, the battery is usually unfit for its intended use. Accordingly, batteries are usually subjected to various tests by different instruments after a charging cycle in order to determine the condition of the battery. However, this procedure is extremely time consuming and uneconomical.

Accordingly, a primary object of the present invention is to provide a battery charger which is adapted to charge a battery at a constant rate of current irrespective of changes in the terminal potential of the battery during the charging cycle.

Another object of the present invention is to provide a battery charger for fully charging a battery within a specified interval of time.

Another object and feature of the present invention resides in the novel details of circuitry which provide a battery charger of the type described which automatically provides an indication that the battery has either attained a required state or charge at the termination of the charging cycle or alternatively, that the battery has not attained the required state of charge, and, therefore, the battery is unfit for use and should be replaced.

In furtherance of the above objects, there is provided a battery charger having a current regulator for regulating the rate of charging current. Control means is provided for producing a signal which is applied to the current regulator to operate the same to maintain the charging current rate constant. The signal produced by said control means is dependent upon the difference between a reference signal and a feedback signal which is proportional to the rate of charging current; both of which signals are applied to the control means. Hence, the battery is charged at a constant rate of current as distinguished from battery chargers of the prior art in which the charging current varied in accordance with the accumulated charge on the battery. As a result the battery may be fully charged within a relatively short time period as compared to prior art battery chargers in which long charging periods were usually encountered which tied up both batteries and equipment.

A timer is provided so that the battery is charged for a predetermined interval of time. The time period is selected so that the battery will be substantially fully charged at the termination of the interval. Moreover, decision circuits are utilized to signify that the battery either is acceptable or non-acceptable for use as determined by the accumulated charge on the battery. Thus, the charger of the present invention is also operable to analyze the battery thereby eliminating extraneous tests and instruments and their attendant costs.

If the battery is incorrectly connected with a battery charger, both the charger and the battery may burn out. Additionally, a current reversal through the battery may cause the battery to explode.

Accordingly, a feature of the present invention is to provide a battery charger having means for disconnecting the battery from the main power circuit in the event that the battery is connected to the battery charger with reversed polarity thereby to protect both the battery and the charger.

Other features and advantages of the present invention will become more apparent from a consideration of the following detailed description when taken in conjunction with the accompanying drawing, in which the single figure is a schematic circuit wiring diagram of a battery charger constructed in accordance with the present invention.

The battery charger of the present invention includes a pair of input terminals 10 and 12 to which a source of alternating current potential 14 is connected. Also provided is a pair of output terminals 16 and 18 which are adapted to be connected to the respective positive and negative terminals of a battery B which is to be charged. The source 14 may be conventional A.C. house current. Hence the terminals 10 and 12 may be connected to a conventional male plug which is adapted to be received in the conventional female house socket.

Generally, the battery charge of the present invention includes a power circuit portion, which is adapted to charge the battery B at a constant rate of current. To this end, the charging current is maintained constant by a silicon controlled rectifier or SCR 20, the conclusion cycle of which is varied by a control signal which is applied between the gate and cathode electrodes of the silicon controlled rectifier 20. The control signal is derived from a reference signal which is produced by a reference signal network, and a feedback signal which is produced by a feedback signal network. The value of the feedback signal is dependent upon the rate of charging current. Thus, if the rate of charging current varies, the feedback signal also will change to vary the conduction cycle of the silicon controlled rectifier 20 thereby maintaining the current at the constant value. Additionally, means are provided to maintain the charging current constant at any one of three values, so that the charger of the present invention may be used to charge one of three differently rated batteries to increase the flexibility of the charger.

More particularly, the power circuit portion of the present invention includes a power transformer 22, one end of the primary winding 22A of which is connected to the input terminal 10, through one set of terminals of a circuit breaker 26 by a lead 28 and through normally closed contacts 164C of a relay 164.

The other end of the primary winding 22A is connected to the input terminal 12 through a series circuit comprising normally open contacts 32A of a relay 32, primary winding 34A of a current transformer 34, and another set of terminals of the circuit breaker 26, by a lead 30. A resistor 36 is connected in parallel with the primary winding 34A of the transformer 34. The transformer 34 forms a portion of the feedback signal network noted above.

Connected across the leads 28 and 30 is a pilot lamp 45 which is adapted to be illuminated when the circuit breaker 26 is closed to notify the operator that power has been applied to the charger. One input terminal of a timer 42 is connected to the lead 28 by a lead 38. The other input terminal of the timer 42 is connected to the lead 30, intermediate the current transformer primary windings 34A and the relay contacts 32A by a lead 40. The timer 42 is also connected to the lead 28 through a normally open push-button switch 44 by a lead 46. The push-button switch 44 is operable to reset the timer 42 when it is desired to initiate a charging cycle.

The timer 42 is of conventional design and is commercially available. The timer is operable to apply a signal to its output terminals for a preselected period of time after the reset push button 44 has been closed momentarily and to remove the signal from the output terminals after this period of time has elapsed. Moreover, the timer 42 is of the type which will not be reset even if the source 14 is accidentally disconnected from the timer. For example, if the timer interval is three hours and the source is disconnected from the timer after two hours has elapsed and is reconnected therewith at some later time, the timer will maintain a signal at the output terminals for another hour only rather than to begin another three hour cycle.

The timer 42 is operable to energize a relay winding 32 which is connected between the output terminals of the timer 42 by respective leads 47 and 48 thereby to close the normally open contacts 32A of the relay 32. Thus, the primary winding 22A of the power transformer 22 will be connected across the source of potential 14 to supply power to the power circuit portion of the battery charger. Connected in series with the relay winding 32, by the lead 48, is a current limiting resistor 50 and a DC blocking capacitor 52. Connected in parallel with the relay winding 32 is a diode 54 to suppress arcing.

Assuming for the moment that the relay contacts 164C remain closed, it will be recognized that the power transformer 22 will be energized only for as long as the relay winding 32 is energized because the contacts 32A control the energization of the transformer 22. Thus, the timer 42 controls the duration of time that the power circuit portion is energized and, therefore, the amount of time during which charging current flows.

The power circuit portion of the battery charger further includes three full-wave diode bridge rectifiers respectively designated 56, 58 and 60, the input terminals of which are connected in parallel and across the secondary winding 22B of the power transformer 22 by leads 62 and 64. Although three bridges are shown, it is to be understood that this is by way of example only. The bridges 56, 58 and 60 are operable to produce positive and negative DC potentials at their respective output terminals in the conventional manner. The respective output terminals 57, 59 and 61 of the bridges 56–60 are connected to a lead 66 through respective resistors 68, 70 and 72. The lead 66 is connected to the anode electrode of the silicon controlled rectifier 20. The cathode electrode of the silicon controlled rectifier 20 is connected to the output terminal 16 of the battery charger, through an ammeter 78, by a lead 80. The ammeter 78 monitors the amplitude of the DC charging current. The negative output terminals 63, 65 and 67 of the respective rectifiers 56–60 are connected to one terminal of normally open contacts 76A of a relay 76 by leads 74. The contacts 76A are adapted to be closed when the winding of the relay 76 is energized. The other terminal of the contacts 76A is connected to the output terminal 18 by a lead 82. Since the relay contacts 76A are connected in series with the output terminal 18 and the power rectifiers 56–60 it will be obvious that the relay contacts 76A must be closed in order to supply charging current to the battery B from the rectifiers 56–60.

As noted above, the contacts 76A are adapted to be closed when the relay winding 76 is energized. The relay winding 76 is energized by a relay power circuit, which is designated generally as being enclosed within the dotted line box 85, and which includes a transformer 84. The primary winding 84A of the transformer 84 is connected in parallel with the lamp 45 by leads 86 and 88 and which is adapted to be energized when the circuit breaker 26 is closed. Secondary winding 84B of the transformer 84 is connected to the input terminals of a full-wave diode bridge rectifier 90. The negative output terminal 91 of the rectifier 90 is connected to the lead 48 by a lead 92. Connected to the positive output terminal 93 of the rectifier 90, by a lead 94, are a pair of serially connected current limiting resistors 96. One end of the relay winding 76 is connected to the lead 94, through a resistor 98, by a lead 100. The other end of the winding 76 is connected to the lead 48. A capacitor 102 is connected in parallel with the relay winding 76. The resistor 98 and the capacitor 102 provide a filter for the rectified DC current which is applied to the relay winding 76 from the bridge 90.

Accordingly, when the circuit breaker 26 is closed, energy will be supplied to the relay winding 76 from the relay power circuit 85 noted hereinabove to cause the contacts 76A of the relay to close. Thus, the battery B, which is connected to the output terminals 16 and 18 will be connected to the power circuit portion of the charger (i.e. the bridges 56–60) thereby to receive charging current.

Connected in parallel with the normally open contacts 76A is a lamp 220. The lamp 220 is adapted to be illuminated when the contacts 76A are open to signify that a battery has been connected to the output terminals 16 and 18 with reversed polarity, in the manner noted below. However, the lamp 220 will not be illuminated when the contacts 76A are closed since the lamp will be shunted by a short circuit.

As noted hereinabove, the rate of charging current supplied to the battery B is maintained constant by the silicon controlled rectifier 20. More particularly, the silicon controlled rectifier 20 is phase controlled by a magnetic amplifier, for example, which is responsive to variations in a feedback signal relative to a reference signal of constant value, to vary the conduction cycle of the silicon controlled rectifier 20 to maintain the current constant. The feedback signal in turn is proportional to the charging current flowing in the primary side of the power transformer 22.

More particularly, connected between the gate electrode, which is designated by the reference numeral 21 and the cathode electrode of the silicon controlled rectifier 20 is a gate control circuit 110. The gate control circuit 110 is a magnetic amplifier of conventional design and is commercially available. Alternatively, the gate control circuit 110 may be of the type shown in FIGURE 4.9 on page 42 of the Silicon Controlled Rectifier Manual, 2nd edition, Copyright 1961 and published by the General Electric Company. Accordingly, control input 1 in FIG. 4.9 may be connected to a reference signal network. Control input 2 may be connected to a feedback signal network. And the output winding would be connected between the gate 21 and cathode electrodes of the silicon controlled rectifier 20. The difference between the feedback and reference signals will determine the phase angle of conduction of the rectifier 20 and, accordingly, maintain the rate of charging current contact.

However, the gate control circuit referred to above is only one of many types of control circuits which may be used to phase control the rectifier 20. Hence, the present invention is not to be interpreted as being limited to this type of control circuit.

As noted hereinabove, one input to the gate control circuit 110 comprises a reference signal of constant amplitude. The reference signal is derived from a reference signal network which may be switched to provide any one of three different constant amplitude signals to maintain the rate of charging current constant at three respective amplitudes. Hence, the battery charger of the present invention may be used to charge batteries having different ratings such as, for example, an 11 ampere-hour battery, a 22 a.h. battery or a 34 a.h. battery.

The reference signal network includes a transformer 112, the primary winding 112A of which is connected in parallel with the primary winding 84A of the relay power circuit 85 by leads 114 and 116. Accordingly, the transformer 112 will also be energized when the circuit breaker 26 is closed. One end of the secondary winding 112B of the transformer 112 is connected to the anode electrode of a diode 118 by a lead 120. Connected to the cathode electrode of the diode 118, by a lead 122, is one end of a resistor 124. The other end of the resistor 124 is connected to one end of respective trimmer potentiometers 126, 128 and 130 by a lead 132. The other ends of the trimmer potentiometers 126–130 are connected to the other end of the secondary winding 112B of the transformer 112 by a lead 134.

Connected between the lead 122 and the lead 134 is a capacitor 136. The diode 118 provides half-wave rectification of the signal appearing across the secondary winding 112B of the transformer 112, and the resistor 124 and capacitor 136 provide a filter circuit for the pulsating DC current produced by the diode 118.

The signal between the leads 132 and 134 is maintained constant by a circuit which includes a Zener diode 138, the cathode electrode of which is connected to the lead 132. Connected to the anode electrode of the Zener diode 138 is the anode electrode of a diode 140. The cathode electrode of another Zener diode 142 is connected to the cathode electrode of the diode 140. The anode electrode of the Zener diode 142 is connected to the lead 134.

Since the diode 118 limits the polarity of signals appearing on the lead 132 to signals of a positive nature, the Zener diodes 138 and 142 will be back biased to produce a constant potential difference between the leads 132 and 134 in the conventional manner.

The respective sliding arms of the trimmer potentiometers 126–130 are connected to the respective terminals 144A, 144B and 144C of a single-pole triple-throw switch 144. Connected between the armature of the switch 144 and an input terminal of the gate control circuit 110 is a diode 146. The diode 146 is polarized so that the anode electrode is connected to the armature of the switch 144.

The armature of the switch 144 may be connected with any one of the terminals 144A, 144B or 144C to apply an appropriate reference signal to the gate control circuit 110 in accordance with the rating of the battery which is to be charged. That is, as noted above, the battery charger of the present invention is adapted to charge any one of three different rated batteries. It should be noted that a reference signal may be applied to the gate control circuit 110 so that the silicon controlled rectifier 20 maintains a constant charging current for any type of battery, the only limitation being that the charging current cannot exceed the current carrying capabilities of the silicon controlled rectifier 20. The trimmer potentiometers 126–130 provide a fine adjustment for obtaining the required value or amplitude of the reference signal applied to the gate control circuit 110.

As noted above, the other input to the control circuit 110 comprises a feedback signal which is proportional to the charging current. However, the current flowing through the primary winding 22A of the power transformer 22 is proportional to the charging current flowing through the silicon controlled rectifier 20 in the secondary circuit and, for all intents and purposes, may be thought of as being representative of the battery charging current. To put this another way, the current flowing through the primary winding 34A of the current transformer 34 is equal to the sum of the currents flowing through the primary winding 22A of the power transformer 22 and the current flowing through the timer 42 and its associated circuits. However, the current flowing through the timer 42 and its associated circuits is negligible as compared to the current flowing through the power transformer. Thus, the current flowing through the primary winding 34A will be proportional to the charging current flowing in the secondary winding 22B of the power transformer 22.

The feedback signal network includes current transformer 34, one end of the secondary winding 34B of which is connected to the anode electrode of a diode 148 by a lead 150. The cathode electrode of the diode 148 is connected to the feedback terminal of the gate control circuit 110 by a lead 152, through a resistor 154. The other end of the secondary winding 34B of the transformer 34 is connected to the cathode electrode of the diode 148 through a parallel circuit comprising a capacitor 156 and resistor 158 by a lead 160. The capacitor 156 and resistor 154 comprise a filter circuit for the half-wave rectified DC current produced by the diode 148. The resistors 154 and 158 provide a voltage divider for the signal appearing at the cathode electrode of the diode 148.

The reference signal appearing on the lead 147 and the feedback signal appearing on the lead 152 are applied to the core in the gate control circuit 110 in the conventional manner thereby to obtain phase control of the silicon controlled rectifier 20. Thus, if the rate of charging current flowing through the battery B increases or decreases above a preselected value, then the signal appearing on the feedback lead 152 will accordingly change relative to the constant reference potential or signal appearing on the lead 147 thereby to increase or decrease the conduction cycle of the silicon controlled rectifier 20 to maintain the rate of charging current at the preselected value.

In accordance with a feature of the present invention, a battery analyzing circuit, which is generally enclosed within the dotted line box 162 in the figure is provided to analyze the charge capabilities of the battery B after the termination of or during a charge cycle and to indicate if a battery is acceptable or unacceptable for use. At the end of a charging cycle, one lamp will be illuminated to indicate that the battery is acceptable or another lamp will be illuminated to indicate that the battery is not acceptable. Moreover, if the battery is fully charged before the timing interval has been terminated, the acceptable lamp will be illuminated to indicate that the battery meets the required specifications, and charging will cease.

More particularly, the battery analyzing circuit 162 is energized from the relay power circuit 85. The lead 94, which is connected to the positive output terminal 93 of the bridge rectifier 90, is connected to one end of a relay winding 164 in the battery analyzing circuit 162 through a normally closed push button switch 166, by a lead 168. The other end of the relay winding 164 is connected to the anode electrode of a silicon controlled rectifier 170, through a resistor 172, by a lead 174. Connected in parallel with the relay winding 164 is a diode 165. The cathode electrode of the silicon controlled rectifier 170 is connected to the lead 178 which, in turn, is connected to the negative output terminal 91 of the bridge rectifier 90 by the lead 92 thereby to complete the energizing circuit for the relay winding 164.

Gate electrode 171 of the silicon controlled rectifier 170 is connected to the cathode electrode of the silicon controlled rectifier through a parallel circuit comprising a resistor 189 and a capacitor 190. The lead 178 also connects the cathode electrode of the silicon controlled rectifier 170 to the anode electrode of a diode 192. The cathode electrode of the diode 192 is connected to the lead 104 by a lead 194.

A lead 167 is connected to the lead 168, between the push button 166 and the relay winding 164, and to the lead 94 through normally closed contacts 32B of the relay 32 and normally open contacts 180A of a relay 180. The relay contacts 32B are adapted to open and the relay contacts 180A are adapted to close when the respective relay windings 32 and 180 are energized.

Connected to the lead 167 between the relay contacts 32B and the relay contacts 180A, through normally closed contacts 164A of the relay 164 is one end of a lamp 182. One end of a lamp 184 is connected to the junction of the lamp 182 and the lead 167 through normally open contacts 164B of the relay 164. The other ends of the respective lamps 182 and 184 are connected to the lead 176.

The lamps 182 and 184 provide a visual indication of the condition of the battery B. The lamp 184 is adapted to be illuminated when the terminal voltage of the battery B reaches a preselected value to signify that the battery is acceptable. On the other hand, the lamp 182 is adapted to be energized if the terminal voltage of the battery does not reach the preselected level to signify that the battery is not acceptable.

The relay winding 180 which controls the operation of the relay contacts 180A is connected between the lead 174 and the anode electrode of the diode 165, through a current limiting resistor 186. Connected in parallel with the relay winding 180 is a diode 189 and a resistor 190. The junction of the diodes 165 and 189 is connected to the junction of the relay winding 164 and resistor 172. Additionally, the diodes 189 and 165 are polarized so that the cathode of the diode 189 is connected to the anode electrode of the diode 165.

Connected between the lead 104 and the lead 106, in parallel with the voltmeter 108 is a series network comprising a resistor 196 and a potentiometer 198. The sliding arm of the potentiometer 198 is connected to the cathode of a Zener diode 200. The anode electrode of the Zener diode is connected to the anode electrode of a diode 202. The cathode electrode of the diode 202 is connected to the cathode electrode of another Zener diode 204. The anode electrode of the Zener diode 204 is connected to the gate electrode 171 of the silicon controlled rectifier 170 by a lead 206.

The network comprising the resistor 196 and the potentiometer 198 is a precision voltage divider network which samples the potential appearing across the battery terminals and applies a portion of this potential to the gate electrode 171 of the silicon controlled rectifier 170. The Zener diodes 200 and 204 and the diode 202 provide a voltage reference network for the potential applied between the gate electrode 171 of the silicon controlled rectifier 170 and the cathode electrode of the silicon controlled rectifier. Accordingly, when the battery voltage is above an acceptable level for the battery, the back-biased Zener diodes will conduct and the bias applied between the gate electrode 171 and the cathode electrode of the silicon controlled rectifier 170 will be of sufficient amplitude to cause the silicon controlled rectifier to fire. It is to be noted that the voltage level of the battery which causes the silicon controlled rectifier 170 to fire may be regulated by moving the sliding arm of the potentiometer 198.

When the rectifier 170 begins to conduct, the relay winding 164 will be connected across the energized leads 94 and 176 (which are connected to the relay power circuit 85) through the circuit elements including the lead 168, the push button switch 166, the winding of the relay 164, the resistor 172 and the silicon controlled rectifier 170 through the lead 174. Additionally, the relay winding 180, which is connected in parallel with the resistor 172, will similarly be energized. As a result, the contacts 164A will open and the contacts 164B and 180A will close. Thus, the lamp 184 will be illuminated by current flowing through the circuit comprising the energized lead 168, relay contacts 180A and 164B, the lamp 184 and the energized lead 176 to signify that the battery B fulfills capacity requirements and it is acceptable for use.

Simultaneously with the illumination of the lamp 184 the normally closed contacts 164C of the energized relay 164 will open to disconnect the primary winding 22A of the transformer 22 from the source 14. Hence, the flow of charging current automatically will cease.

It is to be noted that during the charging cycle the relay contacts 32B will remain open because the relay winding 32 is energized. Hence, current can only be supplied to the lamps 182, 184 through the lead 167 during a charging cycle. In other words, the lamp 184 may be energized only if the silicon controlled rectifier 170 is fired. Moreover, the battery analyzing circuit 162 may be returned to its normal state by momentarily depressing the push button 166. This action opens the circuit between the relay windings 164 and 180 and the relay power circuit 85 to deenergize the relay windings and return contacts 164A, 164B and 180A to their respective normal states.

On the other hand, if the battery B does not attain an acceptable charge during the charging cycle, the silicon controlled rectifier 170 will remain non-conducting and the relay winding 164 will remain deenergized. Hence, the lamp 184 will remain disconnected from the lead 167. However, lamp 182 will remain connected with the lead 167 through the normally closed contacts 164A of the relay 164. At the termination of the timing cycle, the relay winding 32 will be deenergized whereupon the contacts 32B will assume their normally closed state. Thus, power will be supplied to the lamp 182 from the relay power circuit 85 through the leads 94, 167 and 176 and the normally closed contacts 32B and 164A. Hence, the lamp 182 will be illuminated to visually notify the operator that the battery is not acceptable because it has not attained full charge within the charging period.

As a feature of the present invention, a protection circuit, designated generally by the reference numeral 208, is provided to automatically disconnect the battery from the power circuit portion of the charger when the battery is connected to the battery charger with reversed polarity. Generally, the protection circuit 208 is operable to deenergize the relay winding 76 to cause the contacts 76A to open thereby to open the circuit between the battery and the bridge rectifiers 56–60.

More specifically, the protection circuit 208 includes a silicon controlled rectifier 207 having a gate electrode 209. The anode of the silicon controlled rectifier 207 is connected to the junction of the lead 100 and the relay winding 76 by a lead 116. The cathode of the silicon controlled rectifier 207 is connected to the lead 80, between the ammeter 78 and the output terminal 16, through a diode 210 by a lead 212. The diode 210 is polarized so that the anode electrode of the diode is connected to the cathode electrode of the silicon controlled rectifier 207. The lead 48, which is connected to the other end of the relay winding 76, is connected to the cathode of the silicon controlled rectifier 207. Thus, it will be recognized that the silicon controlled rectifier 207 is connected in parallel with the relay winding 76.

It will be appreciated from the above description that when the silicon controlled rectifier 207 is fired or is rendered conductive, the rectifier will essentially provide a shunt path about the relay winding 76 thereby to deenergize the relay winding and, accordingly, cause the contact 76A to open. The silicon controlled rectifier 207 is fired by means of a gate circuit which includes a diode 214 that is connected to the lead 82 through a resistor 216. The cathode electrode of the diode 214 is connected to the gate electrode 209 and to the cathode of the silicon controlled rectifier 207 through a capacitor 218.

If a battery is connected between the output terminals 16 and 18 of the battery charger with reversed polarity, the diode 214 will be forward biased thereby to apply a gating signal between the gate electrode 209 and the cathode electrode of the silicon controlled rectifier 207 to drive the rectifier 207 into conduction. Thus, the relay winding 76 will be shunted with a low impedance thereby to deenergize the relay winding 76 and cause the contacts 76A to open.

As noted hereinabove, the contacts 76A are shunted with a lamp 220. When the contacts 76A are open the current will flow through the lamp 220 to illuminate the same. Consequently, the lamp 220 provides a visual indication that ab attery has been connected across the output terminals 16 and 18 with reversed polarity. That is to say, when the silicon controlled rectifier 207 is fired in response to the incorrect connection of a battery to the output terminals, the contacts 76A will open and the lamp 220 will be illuminated in the manner noted above to signal the opertaor that the polarity of the battery is reversed.

Moreover, a lamp 222 is connected between the leads 80 and 82 and is adapted to be illuminated by a battery when the battery is connected across the output terminals of the battery charger. Thus, the lamp 222 provides a visual indication that a battery has been connected to the battery charger.

While only one set of output terminals have been shown, in practice the leads 104 and 106 terminate in a separate set of terminals which are adapted to be connected directly to the battery terminals. In this manner, the potential appearing on the leads 106 and 104 will be the actual terminal voltage of the battery. However, if only one set of output terminals is provided, as shown in the figure, the signal appearing on the leads 106 and 104 will be the terminal voltage of the battery less the voltage drop in the leads 80 and 82.

In operation, the terminals of a battery B are connected to the output terminals 16 and 18 of the battery charger with the positive terminal of the battery being connected to the terminal 16 and the negative terminal being connected to the terminal 18. The lamp 222 will be illuminated by the battery, in the manner noted above, to indicate that a battery has been connected to the output terminals. The armature of the switch 144 is then operated to one of the terminals 144A–144C in accordance with the rating of the battery to be charged to apply the correct reference signal level to the gate control circuit 110.

The circuit breaker 26 is closed thereby to supply power to both the relay power circuit 85 and the reference signal network transformer 112. Accordingly, the relay winding 76 will be energized; however, the relay winding 32 will remain deenergized due to the fact that the timer 42 has not been operated. Thus, the contacts 32A will remain open and no power will be supplied to the power transformer 22. However, albeit no charging current flows, the battery B will be connected with the rectifiers 56–60 through the now closed relay contacts 76A.

If the battery B has been connected to the battery charger with reversed polarity, the silicon controlled rectifier 207 will be fired in the above-described manner, thereby to deenergize the relay winding 76 to cause the contacts 76A to open. The lamp 220 will be illuminated to notify the operator that the battery has been incorrectly connected to the battery charger and the terminal connections of the battery should be reversed.

When the battery has been correctly connected to the output terminals of the battery charger, the reset switch 44 of the timer 42 may be operated thereby to initiate a charging cycle. Accordingly, relay winding 32 will be energized thereby to close the relay contacts 32A to supply power to the power transformer 22. The bridges 56–60 rectify the signal appearing across the secondary winding 22B of the power transformer 22 and supply a DC charging current, through the silicon controlled rectifier 20, to the battery B. As noted hereinabove, the conduction time of the silicon controlled rectifier 20 will be controlled by the signal from the gate control circuit 110 to maintain the rate of charging current at a constant value. Moreover, the gate control circuit signal will control the conduction time of the silicon controlled rectifier 20 in accordance with the differences between the reference signal appearing on the lead 147 and the current feedback signal appearing on the lead 152. Thus, the battery B will be charged at a constant rate of current for the duration of the charging cycle as determined by the timer.

If the battery attains full charge during the charging cycle or at the termination thereof, the silicon controlled recifier 170 in the battery analyzing circuit 162 will be fired, in the manner noted above, thereby to energize the relays 164 and 180 to cause the accept lamp 184 to be illuminated and the charge current to cease. On the other hand, if the battery does not attain the required charge by the end of the charging cycle, the lamp 182 will be illuminated, in the manner set forth hereinabove, to notify the operator that the battery is not acceptable.

Accordingly, a battery charger has been provided for charging any one of a plurality of differently rated batteries at a constant charging current thereby to charge the same in a minimum interval of time. Additionally, analyzing means are provided for determining whether the battery is acceptable or non-acceptable for use. Moreover, other means are provided for protecting the battery and the battery charger in those where the battery is connected to the battery charger with reversed polarity.

While a preferred embodiment of the invention has been shown and described herein, it will be obvious that numerous omissions, changes and additions may be made in such embodiment without departing from the spirit and scope of the present invention.

What is claimed is:

1. Apparatus for charging a battery at a constant current rate comprising
   a current source and a pair of output terminals adapted to be connected to the terminals of a battery to be charged,
   means for connecting said current source to said pair of output terminals,
   current regulating means having an input, an output and a control electrode for regulating the rate of current flowing between said input and output terminals in response to a control signal applied between said control and input electrodes,
   means for connecting said input and output electrodes in series with said current source and one of said pair of output terminals,
   a reference network for producing a reference signal,
   feedback means connected with said current source for producing a feedback signal proportional to the current flowing through said current regulating means, and control means connected to said reference network, said feedback means and between said control and input electrodes for producing said control signal in response to differences between said reference signal and feedback signal and for applying the same to said current regulating means, whereby said current regulating means maintains said current constant, timing means for connecting said current source with said current regulating means for only a preselected interval of time, and analyzing means adapted to be connected to the terminals of a battery being responsive to a first terminal voltage of a battery for producing a first signal and being responsive to a second terminal voltage of the battery for producing a second signal, said second terminal voltage being less than said first terminal voltage, whereby said first and second signals signify the condition of the battery, said analyzing means including a source of potential, a first lamp for signifying the acceptability of a battery, a second lamp for signifying the non-acceptability of a battery, first relay means connected between said source of potential and said first and second lamps and being operable from a first state to connect said second lamp with said source of potential and to disconnect said first lamp therefrom to a second state to connect said first lamp with said source of potential and to disconnect said second lamp therefrom, and switch means responsive to said first terminal voltage of a battery for connecting said first relay means with said source of potential to move said first relay means to the second state to cause said first lamp to be illuminated to signify the acceptability of a battery.

2. Apparatus for charging a battery as in claim 1, and second relay means connected between said source of potential and said first relay means and being operable in response to the termination of said timer cycle to connect said source of potential with said second lamp if the terminal voltage of the battery is below said first terminal voltage.

3. Battery charging apparatus including a current source and a pair of output terminals adapted to be connected to the terminals of a battery to be charged;

relay means operable in response to a timing signal for connecting said current source with said pair of output terminals to supply charging current to a battery connected between said pair of output terminals;

rectifier means for supplying a unidirectional current to said output terminals;

current regulating means having an input, an output and a control electrode for regulating the rate of unidirectional charging current flowing between said pair of output terminals in response to a control signal applied between said control and input electrodes;

a control network connected between said control and input electrodes for producing said control signal in response to variations in the charging current about a preselected value to operate said current regulating means to maintain said current at said preselected value;

timing means connected to said relay means for producing a timing signal to operate said relay means for a predetermined interval of time;

whereby charging current having said preselected value is supplied to a battery connected between said pair of output terminals for said predetermined interval of time, disconnect means connected between said current source and one of said pair of output terminals for disconnecting said current source from said one output terminal, and sensing means connected between said pair of output terminals and in parallel with a battery connected thereto; and being responsive to the connection of a battery to said output terminals with reversed polarity for operating said disconnect means, and analyzing means adapted to be connected to the terminals of a battery connected between said pair of output terminals, said analyzing means being responsive to a first terminal voltage corresponding to full charge of the battery for producing a first signal and being responsive to a second terminal voltage of the battery for producing a second signal, said second terminal voltage being less than the said first terminal voltage, whereby said first and second signals indicate the condition of a battery connected between said pair of output terminals, said analyzing means including disabling means connected between said current source and said current regulating means and being responsive to said first terminal voltage corresponding to full charge of the battery to disconnect said current source from said current regulating immediately upon the battery attaining full charge.

4. Battery charging apparatus as in claim 3, in which said current regulating means comprises a silicon controlled rectifier having an anode electrode corresponding to said output electrode, a cathode electrode corresponding to said input electrode, and a gate electrode corresponding to said control electrodes;

said anode electrode being connected to one terminal of said current source;

said cathode electrode being connected to said output terminal;

said control network being connected between said gate electrode and said cathode electrode;

whereby said control signal is operable to vary the phase angle of conduction of said silicon controlled rectifier to maintain the charging current at said preselected value.

References Cited

UNITED STATES PATENTS

| | | | |
|---|---|---|---|
| 3,176,215 | 3/1965 | Kusko | 323—24 |
| 3,217,225 | 11/1965 | Gottlieb et al. | 320—37 |
| 3,258,672 | 6/1966 | Godshalk et al. | 320—25 |
| 3,343,060 | 9/1967 | Ingraham | 320—40 |
| 3,350,628 | 10/1967 | Gallaher et al. | 323—4 |
| 3,365,645 | 1/1968 | Jacobs | 320—25 |
| 3,375,435 | 3/1968 | Baugher | 323—4 |

JOHN F. COUCH, *Primary Examiner.*

STANLEY WEINBERG, *Assistant Examiner.*

U.S. Cl. X.R.

320—34, 40, 48; 323—4, 20